United States Patent
Okumoto et al.

(10) Patent No.: US 8,576,360 B2
(45) Date of Patent: Nov. 5, 2013

(54) COLOR FILTER SUBSTRATE, LIQUID CRYSTAL DISPLAY PANEL, AND LIQUID CRYSTAL DISPLAY DEVICE

(75) Inventors: Yoshitaka Okumoto, Osaka (JP); Yusuke Waratani, Osaka (JP); Keita Katayose, Osaka (JP); Takayuki Nakano, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 133 days.

(21) Appl. No.: 13/394,816

(22) PCT Filed: Jun. 30, 2010

(86) PCT No.: PCT/JP2010/061167
§ 371 (c)(1),
(2), (4) Date: Mar. 8, 2012

(87) PCT Pub. No.: WO2011/030604
PCT Pub. Date: Mar. 17, 2011

(65) Prior Publication Data
US 2012/0169975 A1    Jul. 5, 2012

(30) Foreign Application Priority Data
Sep. 9, 2009    (JP) ................................. 2009-208452

(51) Int. Cl.
*G02F 1/1335*    (2006.01)
*G02F 1/1333*    (2006.01)
*G02F 1/136*    (2006.01)

(52) U.S. Cl.
USPC ............. 349/106; 349/58; 349/109; 349/110; 349/44; 359/891

(58) Field of Classification Search
USPC ............... 349/106, 58, 109, 110, 44; 359/891
See application file for complete search history.

(56) References Cited

U.S. PATENT DOCUMENTS

| | | | | |
|---|---|---|---|---|
| 6,677,243 | B2 * | 1/2004 | Okada et al. | 438/706 |
| 7,215,392 | B2 * | 5/2007 | Nakano et al. | 349/106 |
| 7,952,662 | B2 * | 5/2011 | Itou et al. | 349/114 |
| 8,144,291 | B2 * | 3/2012 | Niiya | 349/106 |
| 2005/0236950 | A1 | 10/2005 | Maeda et al. | |
| 2007/0268208 | A1 | 11/2007 | Okada et al. | |

(Continued)

FOREIGN PATENT DOCUMENTS

| | | |
|---|---|---|
| JP | 08-095024 A | 4/1996 |
| JP | 10-307205 A | 11/1998 |

(Continued)

OTHER PUBLICATIONS

Official Communication issued in International Patent Application No. PCT/JP2010/061167, mailed on Sep. 28, 2010.

*Primary Examiner* — Mike Qi
(74) *Attorney, Agent, or Firm* — Keating & Bennett, LLP (57) ABSTRACT

The present invention provides a color filter substrate in which reduction in display qualities is suppressed even if color mixing is generated when a plurality of differently colored transparent layers are formed by a method using a liquid material, such as an ink jet method, and to provide a liquid crystal display panel and a liquid crystal display device each including the color filter substrate. The color filter substrate of the present invention comprises a plurality of color display units, each of the color display units including four or more differently colored transparent layers,
  wherein the color filter substrate includes a frame structure which surrounds each of the differently colored transparent layers, and
  the differently colored transparent layers are arranged such that an average of color difference values for pairs of adjacent differently colored transparent layers becomes minimum.

18 Claims, 8 Drawing Sheets

(56) References Cited

U.S. PATENT DOCUMENTS

| | | |
|---|---|---|
| 2009/0128752 A1 | 5/2009 | Itou et al. |
| 2009/0141381 A1 | 6/2009 | Itou et al. |
| 2011/0187628 A1 | 8/2011 | Okada et al. |

FOREIGN PATENT DOCUMENTS

| | | |
|---|---|---|
| JP | 2001-209047 A | 8/2001 |
| JP | 2001-306023 A | 11/2001 |
| JP | 2003-163940 A | 6/2003 |
| JP | 2005-234133 A | 9/2005 |
| JP | 2005-309305 A | 11/2005 |
| JP | 2007-094337 A | 4/2007 |
| JP | 2009-145910 A | 7/2009 |
| WO | 03/088203 A1 | 10/2003 |
| WO | 2006/018926 A1 | 2/2006 |
| WO | 2006/109577 A1 | 10/2006 |

\* cited by examiner

COLOR FILTER SUBSTRATE, LIQUID CRYSTAL DISPLAY PANEL, AND LIQUID CRYSTAL DISPLAY DEVICE

TECHNICAL FIELD

The present invention relates to a color filter substrate, a liquid crystal display panel, and a liquid crystal display device.

BACKGROUND ART

Liquid crystal display devices are display devices including a liquid crystal display panel which has a pair of substrates and a liquid crystal layer disposed therebetween, and perform display by changing a polarization state of light by changing an alignment state of the liquid crystal layer to which a voltage is applied using electrodes formed on the substrates. Therefore, liquid crystal display devices are non-emissive display devices which require light sources in addition to liquid crystal display panels. In such liquid crystal display devices, a plurality of differently colored transparent layers (color filters) are formed for performing color display on a color filter substrate of a pair of substrates.

A color filter substrate generally includes a plurality of differently colored color filters which are regularly arranged on the entire display area. A pixel which is the smallest unit performing color display is generally composed of color filters with respective three primary colors of red (R), green (G), and blue (B). However, such three primary colors can produce only a part of color region which can be visible by human eyes, and high color saturation cannot be reproduced. Therefore, use of four or more differently colored color filters is proposed in order to increase the color reproduction range (for example, refer to Patent Documents 1 to 8).

Further, improvement in yield of desired product has been needed for suppressing increase in production costs in production of liquid crystal display devices. Therefore, methods for appropriately modifying defects of color filters are needed in production processes of color filter substrates. In recent years, an ink jet method has been examined as a method for forming color filters. However, inks with different colors dropped on the substrate may be mixed to cause defects of color mixing in color filters. On the other hand, a method for reproducing color filters in portions obtained by removing color mixing portions by laser irradiation, such as YAG laser beam irradiation, has been known. However, even if the defects are modified by such a method, display qualities may be considerably degraded.

Patent Document 1: JP 2001-209047 A
Patent Document 2: JP 2001-306023 A
Patent Document 3: JP 2003-163940 A
Patent Document 4: WO 03/088203
Patent Document 5: JP 2005-234133 A
Patent Document 6: JP 2005-309305 A
Patent Document 7: WO 2006/018926
Patent Document 8: WO 2006/109577

DISCLOSURE OF THE INVENTION

The present invention has been made in view of the above-described state of the art. The object of the present invention is to provide a color filter substrate in which reduction in display qualities is suppressed even if color mixing is generated when a plurality of differently colored transparent layers are formed by a method using a liquid material, such as an ink jet method, and to provide a liquid crystal display panel and a liquid crystal display device each including such a color filter substrate.

The present inventors have made various studies on color mixing generated when a plurality of differently colored transparent layers are formed by a method using a liquid material, such as an ink jet method, and have noted the followings: even if a colored transparent layer is reproduced in a portion obtained by removing a portion in which colors are mixed (hereinafter, referred to as "color mixing portion") by laser irradiation and the like, display qualities after this process may be considerably degraded. This is because it is difficult to completely remove the color mixing portion when the colored transparent layer has a complicated shape. As a result of further intensive investigations by the present inventors, it has been found that the degree of reduction in display qualities after the above process changes depending on the arrangement of colored transparent layers, and the decrease in color difference and the decrease in luminance difference between a color mixing portion and a portion where the colored transparent layer is reproduced (hereinafter, referred to as "modified portion") allows suppression of reduction in display qualities. Specifically, it has been found that reduction in display qualities can be sufficiently suppressed by arranging the differently colored transparent layers such that an average of color difference values for pairs of adjacent differently colored transparent layers becomes minimum or an average of luminance difference values for pairs of adjacent differently colored transparent layers becomes minimum. Further, in the preferred embodiment of the present invention, there are more patterns of color arrangement when four or more differently colored transparent layers are used as one color display unit compared to when three differently colored transparent layers are used as one color display unit. Therefore, a pair of differently colored transparent layers between which at least one of color difference and luminance difference is maximum can be disposed away from each other. As described above, in the case where four or more differently colored transparent layers are used as one color display unit, at least one of color difference and luminance difference between a modified portion and a color mixing portion is reduced by disposing the colored transparent layers in the above-described relations away from each other. The inventors found that, thereby, reduction in display qualities is suppressed not to cause problems in practical use. The above-mentioned problems can be admirably solved, leading to completion of the present invention.

That is, the present invention is a color filter substrate (hereinafter, also referred to as "a first color filter substrate of the present invention"), comprising a plurality of color display units, each of the color display units including four or more differently colored transparent layers, wherein the color filter substrate includes a frame structure which surrounds each of the differently colored transparent layers, and the differently colored transparent layers are arranged such that an average of color difference values for pairs of adjacent differently colored transparent layers becomes minimum. It is preferable that the four or more transparent layers are arranged such that a pair of differently colored transparent layers between which color difference is maximum are disposed away from each other. It is particularly preferable that the four or more colored transparent layers are arranged such that with respect to each colored transparent layers, a pair of differently colored transparent layers between which color difference is maximum are disposed away from each other.

The present invention is also a color filter substrate (hereinafter, also referred to as "a second color filter substrate of the present invention"), comprising a plurality of color display units, each of the color display units including four or more differently colored transparent layers, wherein the color filter substrate includes a frame structure which surrounds each of the differently colored transparent layers, and the differently colored transparent layers are arranged such that an average of luminance difference values for pairs of adjacent differently colored transparent layers becomes minimum. It is preferable that the four or more transparent layers are arranged such that a pair of differently colored transparent layers between which luminance difference is maximum are disposed away from each other. It is particularly preferable that the four or more colored transparent layers are arranged such that with respect to each colored transparent layers, a pair of differently colored transparent layers between which luminance difference is maximum are disposed away from each other.

It is preferable that the present invention is also a color filter substrate, comprising a plurality of color display units, each of the color display units including four or more differently colored transparent layers, wherein the color filter substrate includes a frame structure which surrounds each of the differently colored transparent layers, the differently colored transparent layers are arranged such that an average of color difference values for pairs of adjacent differently colored transparent layers becomes minimum and an average of luminance difference values for pairs of adjacent differently colored transparent layers becomes minimum. It is preferable that the present invention is also a color filter substrate, comprising a plurality of color display units, each of the color display units including four or more differently colored transparent layers, wherein the color filter substrate includes a frame structure which surrounds each of the differently colored transparent layers, and the transparent layers are arranged such that a pair of differently colored transparent layers between which color difference is maximum are disposed away from each other and a pair of differently colored transparent layers between which luminance difference is maximum are disposed away from each other.

Preferred embodiments of the first and the second color filter substrates of the present invention are described below.

The preferred embodiments include the embodiment in which the colored transparent layers are formed by an ink-jet method. In an ink jet method, colored transparent layers are formed by supplying droplets of a material thereof into an area surrounded by a frame structure. If the frame structure may have a chip or inks may be supplied out of the target position, color mixing may be generated. In case of such color mixing being generated, the color mixing portion is removed and a colored transparent layer is reproduced therein. According to the present invention, even if such color mixing cannot be completely removed, reduction in display qualities can be sufficiently suppressed.

The preferred embodiments include the embodiment in which in the color filter substrate, each of the transparent layers is arranged in a central portion of an area surrounded by the frame structure, and a color mixing portion generated by adjacent differently colored transparent layers is left at an outer edge portion of the area surrounded by the frame structure. If each of the colored transparent layers has, for example, a complicated shape, a color mixing portion is likely to be left at the outer edge portion. According to the present invention, reduction in display qualities can be sufficiently suppressed even if a color mixing portion is not completely removed due to restrictions of a removal process of the color mixing portion.

The preferred embodiments include the embodiment in which the frame structure is made of a light-shielding resin material. The frame structure made of a light-shielding material may have a complicated shape. The frame structure made of a resin material may be carved when exposed to a laser beam for removing the color mixing portion. Therefore, the color mixing portion is likely not to be completely removed in the above-described embodiment. The colored transparent layers are particularly desirably arranged in accordance with the present invention.

An embodiment of the first color filter substrate of the present invention and preferred embodiments thereof are explained below.

The first color filter substrate of the present invention includes the color display units in each of which differently colored transparent layers are arranged such that an average of color difference values for pairs of adjacent differently colored transparent layers becomes minimum. The plurality of color display units provided on the color filter substrate may have a color mixing portion of a combination of different colors. Such an embodiment allows an average of the color difference values between modified portions and color mixing portions to stochastically minimize. Therefore, reduction in display qualities can be particularly effectively suppressed.

The preferred embodiments include the embodiment in which in at least a direction parallel to a shorter side of a colored transparent layer, the transparent layers are arranged such that a pair of differently colored transparent layers between which color difference is maximum are disposed away from each other. Color mixing is likely to be generated over the frame structure in a direction parallel to the shorter side of an area for a colored transparent layer. For example, in the case where the colored transparent layers are formed by an ink-jet method, a droplet which has reached the area for a colored transparent layer tends to form in a round shape due to surface tension. Therefore, even when the area has a substantially rectangular shape, the frame structure prevents the droplet from spreading particularly in a direction parallel to the shorter side of the area. Accordingly, the colored transparent layers are particularly desirably arranged in accordance with the present invention at least in a direction parallel to the shorter side of an area for a colored transparent layer along which color mixing is likely to be generated.

The preferred embodiment include the embodiment in which in at least a direction perpendicular to the line of the narrower portion of the frame structure, the transparent layers are arranged such that a pair of differently colored transparent layers between which color difference is maximum are disposed away from each other. Color mixing is likely to be generated over a narrower portion of the frame structure. Accordingly, the colored transparent layers are particularly desirably arranged in accordance with the present invention in a direction in which differently colored transparent layers are arranged adjacently with the narrower portion interposed between them.

An embodiment of the second color filter substrate of the present invention and preferred embodiments thereof are explained below.

The second color filter substrate of the present invention includes the color display units in each of which differently colored transparent layers are arranged such that an average of luminance difference values for pairs of adjacent differently colored transparent layers becomes minimum. The plurality of color display units provided on the color filter substrate may have a color mixing portion of a combination of different colors. Such an embodiment allows an average of the luminance difference values between modified portions and color mixing portions to stochastically minimize. Therefore, reduction in display qualities can be particularly effectively suppressed.

The preferred embodiments include the embodiment in which in at least a direction parallel to a shorter side of a colored transparent layer, the transparent layers are arranged such that a pair of differently colored transparent layers between which luminance difference is maximum are disposed away from each other. Color mixing is likely to be generated over the frame structure in a direction parallel to the shorter side of an area for a colored transparent layer. For example, in the case where the colored transparent layers are formed by an ink-jet method, a droplet which has reached the area for a colored transparent layer tends to form in round shape due to surface tension, even when the area has a substantially rectangular shape. Therefore, the frame structure is required to prevent the droplet from spreading particularly in a direction parallel to the shorter side of the area. Accordingly, the colored transparent layers are particularly desirably arranged in accordance with the present invention at least in a direction parallel to the shorter side of an area for a colored transparent layer along which color mixing is likely to be generated.

The preferred embodiment include the embodiment in which in at least a direction perpendicular to the line of the narrower portion of the frame structure, the transparent layers are arranged such that a pair of differently colored transparent layers between which luminance difference is maximum are disposed away from each other. Color mixing is likely to be generated over a narrower portion of the frame structure. Accordingly, the colored transparent layers are particularly desirably arranged in accordance with the present invention in a direction in which differently colored transparent layers are arranged adjacently with the narrower portion interposed between them.

The present invention is also a liquid crystal display panel, comprising: the first or second color filter substrate of the present invention; a counter substrate; and a liquid crystal layer disposed between the color filter substrate and the counter substrate.

The present invention is also a liquid crystal display device including the liquid crystal display panel.

The embodiments described above may be suitably combined with each other without departing from the scope of the present invention.

Effect of the Invention

According to the color filter substrate, liquid crystal display panel, and liquid crystal display device of the present invention, when four or more differently colored transparent layers are used as a color display unit, the differently colored transparent layers are arranged such that at least one of the average of color difference values for pairs of adjacent differently colored transparent layers and the average of luminance difference for pairs of adjacent differently colored transparent layers becomes minimum. Thereby, even if color mixing is generated in differently colored transparent layers formed by a method using a liquid material, such as an ink jet method, reduction in display qualities can be suppressed not to cause problems in practical use by reducing at least one of the color difference between a modified portion and a color mixing portion and the luminance difference between a modified portion and a color mixing portion.

MODES FOR CARRYING OUT THE INVENTION

The present invention is described in more detail below with reference to Embodiments, but not limited only thereto.

Embodiment 1

Figure 1:
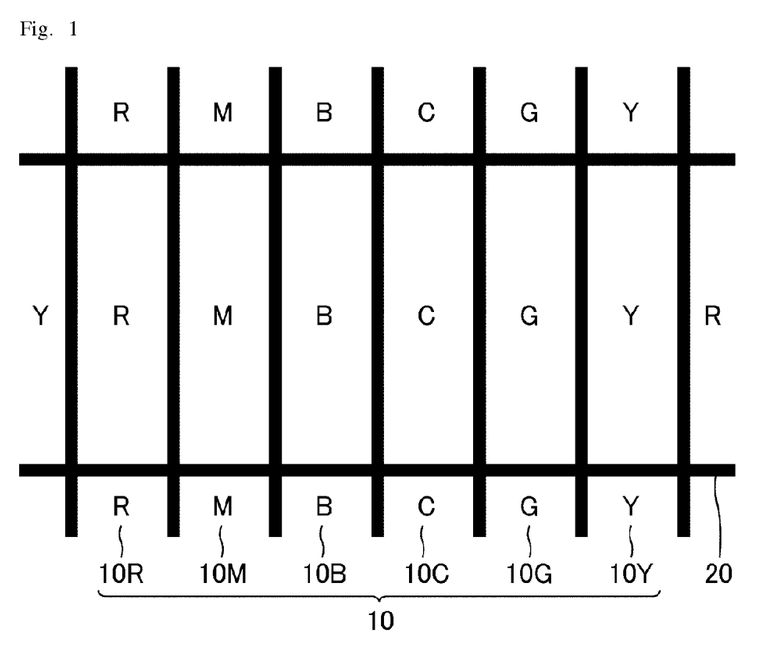
FIG. 1 is a plan view schematically showing the structure of the color filter substrate of Embodiment 1.

The present embodiment shows an example of arrangement of six differently colored transparent layers. FIG. 1 is a plan view schematically showing the structure of the color filter substrate of Embodiment 1. As shown in FIG. 1, the color filter substrate of the present embodiment includes a plurality of color display units 10 each of which corresponds to a minimum display unit (pixel) for color display of a display device are arranged in a plane. Hereinafter, such a color display unit in the color filter substrate is also referred to as a "pixel", and an area where one colored transparent layer is disposed in the color filter substrate is also referred to as a "sub pixel".

Each pixel 10 is provided with six differently colored transparent layers, that is, a red (R) layer 10R, a magenta (M) layer 10M, a blue (B) layer 10B, a cyan (C) layer 10C, a green (G) layer 10G, and a yellow (Y) layer 10Y. The colored transparent layers are generally called color filters, which are formed of a colored transparent resin material. The colored transparent layers 10R, 10M, 10B, 10C, 10G, and 10Y are separated by a frame structure 20 formed of a light-shielding resin material. The quantities of light beams transmitting respective six differently colored transparent layers 10R, 10M, 10B, 10C, 10G, and 10Y are separately controlled. Thereby, display light with a desired color can be created in the pixel 10, which allows color display.

In the present embodiment, the colored transparent layers are arranged in the pixel 10 in one row and six columns. The same-colored transparent layers are arranged in one direction in the color filter substrate, which makes a stripe arrangement. Accordingly, in the color filter substrate, the same-colored transparent layers are sequentially arranged in the longitudinal direction of FIG. 1, and the colored transparent layers 10R, 10M, 10B, 10C, 10G, and 10Y are arranged so that repeating units of red (R), magenta (M), blue (B), cyan (C), green (G), and yellow (Y) are sequentially arranged in the transverse direction of FIG. 1. Therefore, in the pixel 10, red (R) is adjacent to magenta (M), magenta (M) is adjacent to blue (B), blue (B) is adjacent to cyan (C), cyan (C) is adjacent to green (G), and green (G) is adjacent to yellow (Y). Further, yellow (Y) and red (R) are adjacent to each other at a boundary of the two adjacent pixels 10.

In view of color difference, in the color arrangement of the present embodiment, the colored transparent layers 10R, 10M, 10B, 100, 10G, and 10Y are arranged such that a pair of differently colored transparent layers between which color difference is maximum are disposed away from each other.

Figure 2:
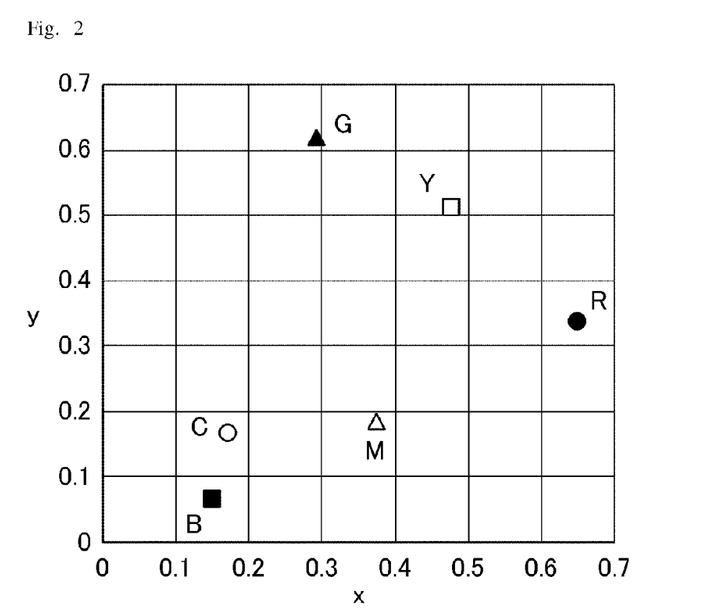
FIG. 2 is a chromaticity diagram of XYZ color system which represents chromaticity of red (R), magenta (M), blue (B), cyan (C), green (G), and yellow (Y).

FIG. 2 is a chromaticity diagram of XYZ color system which represents chromaticity of red (R), magenta (M), blue (B), cyan (C), green (G), and yellow (Y). Table 1 shows color differences between different colors, that is, between each of reference colors of red (R), magenta (M), blue (B), cyan (C), green (G), and yellow (Y), and a comparative color. The color differences are determined based on FIG. 2 and ranked in ascending order with respect to the respective reference colors.

TABLE 1

|  |  | Comparative color | | | | | |
| --- | --- | --- | --- | --- | --- | --- | --- |
|  |  | R | G | B | C | M | Y |
| Reference color | R |  | 4 | 5 | 3 | 2 | 1 |
|  | G | 2 |  | 5 | 3 | 4 | 1 |
|  | B | 3 | 4 |  |  | 2 | 1 | 5 |
|  | C | 3 | 4 | 2 |  | 1 | 5 |
|  | M | 3 | 5 | 1 | 2 |  | 4 |
|  | Y | 2 | 1 | 5 | 4 | 3 |  |

As described in FIG. 2 and Table 1, a colored transparent layer which shows the maximum color difference with respect to the red (R)-colored transparent layer 10R is the blue (B)-colored transparent layer 10B, a colored transparent layer which shows the maximum color difference with respect to the green (G)-colored transparent layer 10G is the blue (B)-colored transparent layer 10B, a colored transparent layer which shows the maximum color difference with respect to the blue (B)-colored transparent layer 10B is the yellow (Y)-colored transparent layer 10Y, a colored transparent layer which shows the maximum color difference with respect to the cyan (C)-colored transparent layer 10C is the yellow (Y)-colored transparent layer 10Y, a colored transparent layer which shows the maximum color difference with respect to the magenta (M)-colored transparent layer 10M is the green (G)-colored transparent layer 10G, and a colored transparent layer which shows the maximum color difference with respect to the yellow (Y)-colored transparent layer 10Y is the blue (B)-colored transparent layer 10B. The above-mentioned pairs, specifically, a pair of red (R) and blue (B), a pair of green (G) and blue (B), a pair of blue (B) and yellow (Y), a pair of cyan (C) and yellow (Y), and a pair of magenta (M) and green (G) are each disposed away from each other not to be adjacent to each other in the color filter substrate of the present embodiment. Among them, a pair of blue (B) and yellow (Y) show the maximum color difference of pairs of differently colored transparent layers. In the present embodiment, these colored transparent layers showing the maximum color difference therebetween are disposed away from each other. Further, the color arrangement of the present embodiment (red (R)-magenta (M)-blue (B)-cyan (C)-green (G)-yellow (Y)-red (R)) is such that an average of color difference values for pairs of adjacent differently colored transparent layers becomes minimum. As used herein, the color difference is commonly used in the technical field of the present invention, and is represented by color space coordinates including information of brightness in addition to information of hue and color saturation shown in FIG. 2. The color difference is represented by ΔEab*.

In view of luminance difference, a pair of blue (B) and yellow (Y) show the maximum luminance difference therebetween. In color arrangement of the present embodiment, these colored transparent layers showing the maximum luminance difference therebetween are disposed away from each other.

Figure 3:
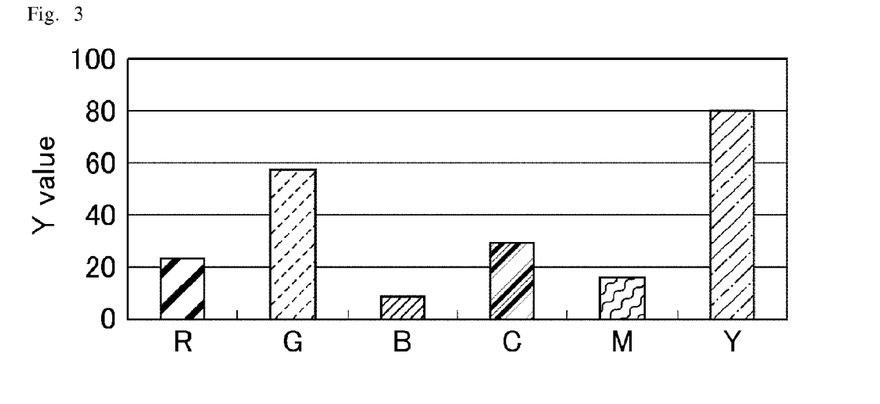
FIG. 3 is a graph showing luminance values (Y values) of red (R), magenta (M), blue (B), cyan (C), green (G), and yellow (Y).

FIG. 3 is a graph showing luminance values (Y values) of red (R), magenta (M), blue (B), cyan (C), green (G), and yellow (Y). FIG. 3 shows that the yellow (Y)-colored transparent layer shows the maximum luminance difference with respect to the red (R)-colored transparent layer, the blue (B)-colored transparent layer shows the maximum luminance difference with respect to the green (G)-colored transparent layer, the yellow (Y)-colored transparent layer shows the maximum luminance difference with respect to the blue (B)-colored transparent layer, the yellow (Y)-colored transparent layer shows the maximum luminance difference with respect to the cyan (C)-colored transparent layer, the yellow (Y)-colored transparent layer shows the maximum luminance difference with respect to the magenta (M)-colored transparent layer, the blue (B)-colored transparent layer shows the maximum luminance difference with respect to the yellow (Y)-colored transparent layer. The color arrangement of the present embodiment (red (R)-magenta (M)-blue (B)-cyan (C)-green (G)-yellow (Y)-red (R)) is such that an average of luminance difference values for pairs of adjacent differently colored transparent layers becomes minimum.

A production method of the color filter of the present Embodiment is explained below.

Figure 4:
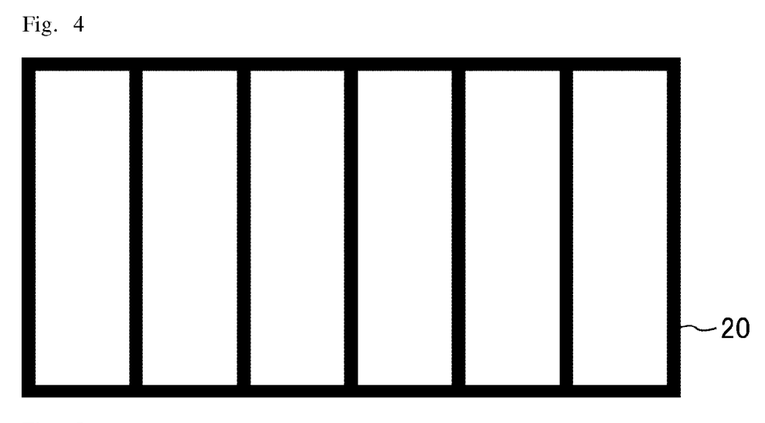
FIG. 4 is a plan view showing a frame structure in a manufacturing flow of the color filter substrate of Embodiment 1.

First, a black layer is formed by attaching a film made of a resin material containing a black pigment on entire substrates, such as a glass substrate and a resin substrate. Next, the black layer is patterned by photolithography to form the frame structure 20 in a lattice pattern which is provided with a plurality of rectangular openings shown in FIG. 4. The rectangular openings correspond to areas in which colored transparent layers are to be arranged. Liquid materials for the colored transparent layers are supplied by droplets into the openings in a subsequent process. The frame structure keeps the liquid material for the colored transparent layers in a predetermined position. The frame structure has a light-shielding function, and is therefore called a black matrix.

Figure 5:
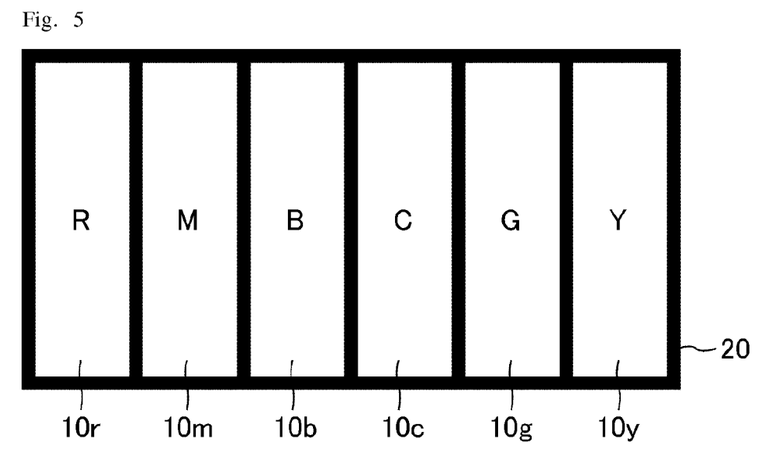
FIG. 5 is a plan view showing a normal pixel after inks are supplied in a manufacturing flow of the color filter substrate of Embodiment 1.

Next, the droplets of the liquid material (hereinafter, also referred to as "ink") for forming the colored transparent layers are supplied from an ink jet device into the openings of the frame structure. The surface of the frame structure may be pretreated by fluorine plasma treatment to make a liquid-repellent surface before the inks are supplied. Such a liquid-repellent surface effectively prevents the inks supplied in the openings from leaking over a portion of the frame structure outside the opening. As shown in FIG. 5, in the present embodiment, six differently colored inks of red (R) ink 10*r*, magenta (M) ink 10*m*, blue (B) ink 10*b*, cyan (C) ink 10*c*, green (G) ink 10*g*, and yellow (Y) ink 10*y* are supplied by droplets in different openings. The six differently colored inks 10*r*, 10*m*, 10*b*, 10*c*, 10*g*, and 10*y* completely supplied are dried and burned. Thus, the colored transparent layers 10R, 10M, 10B, 10C, 10G, and 10Y are completed.

FIG. 5 shows a pixel in which colored transparent layers are normally formed in sub pixels, respectively. In such sub pixels, the frame structure may have a chip or the ink droplets may be supplied to a position out of the target position, which may cause contacts between the differently colored inks and the like. Such phenomenon is called "color mixing". The frame structure with a chip is formed, for example, in the case where the black layer is not exposed to light in a desired pattern through a photomask to which contaminants including dust is attached and the black layer is not thereby patterned in a desired shape by photolithography; or in the case that when a film for a black layer is attached to a substrate, a portion of the film for a black layer is unattached to the substrate due to dust or air bubbles between the film and the substrate, which leads to detachment of a portion of the frame structure from the substrate. The ink droplets may be supplied to a position out of the target position when a nozzle of an ink jet device is clogged and the like.

Figure 6:
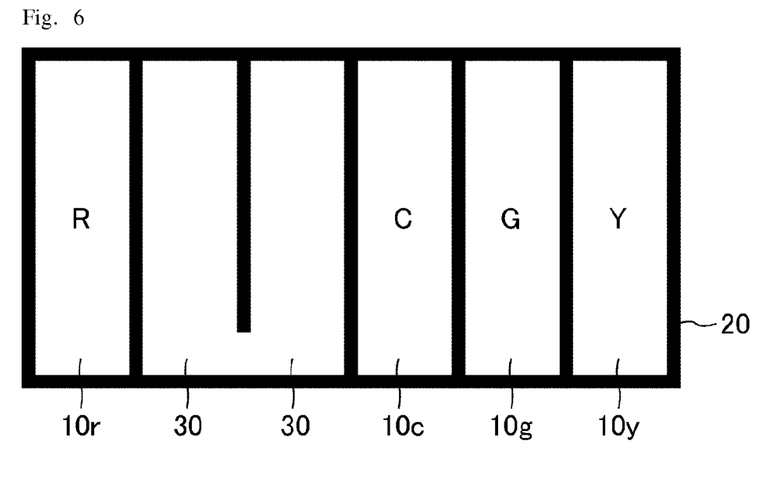
FIG. 6 is a view showing a pixel having a color mixing portion which is generated after the supply of inks due to a chip of the flame structure in a manufacturing flow of the color filter substrate of Embodiment 1.

FIG. 6 is a view showing a pixel having a color mixing portion which is generated after the supply of inks due to a chip of the flame structure in a manufacturing flow of the color filter substrate of Embodiment 1. In FIG. 6, the frame structure 20 has a chip in a portion separating a sub pixel for magenta (M) and a sub pixel for blue (B). Therefore, magenta (M) ink 10*m* and blue (B) ink 10*b* are mixed and the resulting ink 30 with a neutral color of the magenta (M) ink and the blue (B) ink is fed into both the sub pixel for magenta (M) and the sub pixel for blue (B). Examples of states of the color mixing include: a state in which two or more different colors in adjacent sub pixels are mixed, resulting in a neutral color; and further include, but depend on a drawing process of ink droplets (degree of dryness of the inks at the time of the generation of the color mixing) and components of the inks, a state in which ink of one sub pixel is flowed into the other sub pixel; a state in which two or more differently colored inks are not completely mixed in adjacent sub pixels; and a state in which pigment components are coagulated and two or more inks are mixed to be black.

FIG. 6 illustrates an example of the frame structure 20 which has a chip in a portion separating a sub pixel for magenta (M) and a sub pixel for blue (B). Actually, the frame structure 20 may have a chip such that a plurality of sub pixels are communicated with each other since the size of each sub pixel is very small.

Figure 7:
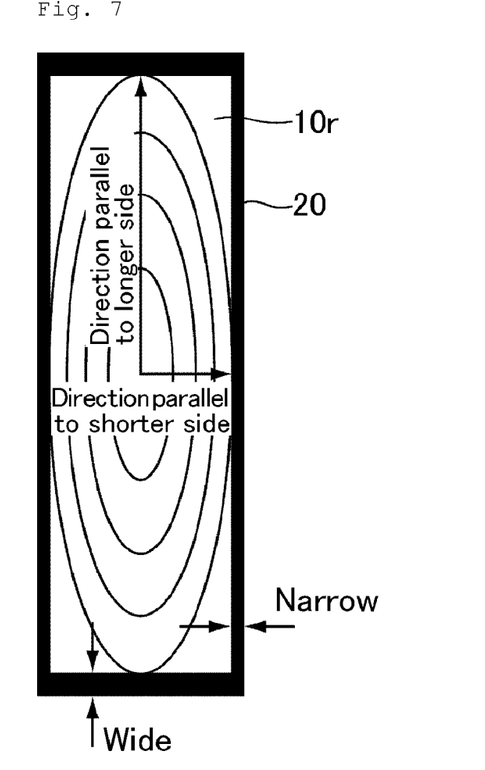
FIG. 7 is a view illustrating the relation between the structure of a frame structure and frequency of color mixing.

FIG. 7 is a view illustrating the relation between the structure of a frame structure and frequency of color mixing. The ink 10*r* supplied by droplets to a rectangular opening of the frame structure 20 is in a liquid state. Therefore, as shown in FIG. 7, the ink 10*r* may spread according to the frame structure 20, while maintaining a round shape due to surface tension of the ink 10*r* when viewed in plan. Accordingly, although the ink 10*r* spreads across the entire area of the opening of the frame structure 20, the contour lines of the ink 10*r* shown in FIG. 7 shows that the ink 10*r* has the largest thickness at the center portion of the opening, and the largest thickness gently decreases in a direction parallel to the longer side of the opening and steeply decreases in a direction parallel to the shorter side of the opening. In the rectangular openings, sub pixels adjacent to each other in a direction parallel to the shorter side of each opening are likely to generate color mixing because of the characteristics of the ink 10*r* that the ink 10*r* tends to take a round shape when viewed in plan. Accordingly, in the frame structure provided with openings each having a shape which is long in any direction unlike square or circle, it is preferable that in at least a direction parallel to the shorter side of a colored transparent layer, the transparent layers are arranged such that a pair of differently colored transparent layers between which color difference is maximum are disposed away from each other. Similarly to the color difference, it is preferable that in at least a direction parallel to the shorter side of a colored transparent layer, the transparent layers are arranged such that a pair of differently colored transparent layers between which luminance difference is maximum are disposed away from each other.

Color mixing is likely to be generated when the line width of the frame structure 20 is small. As shown in FIG. 7, when the frame structure 20 has two kinds of portions different in width extending in directions which are substantially perpendicular to each other, it is preferable that in at least a direction perpendicular to the line of the narrower portion of the frame structure, the transparent layers are arranged such that a pair of differently colored transparent layers between which color difference is maximum are disposed away from each other. Similarly to the color difference, it is preferable that in at least a direction perpendicular to the line of the narrower portion of the frame structure, the transparent layers are arranged such that a pair of differently colored transparent layers between which luminance difference is maximum are disposed away from each other.

Figure 8:
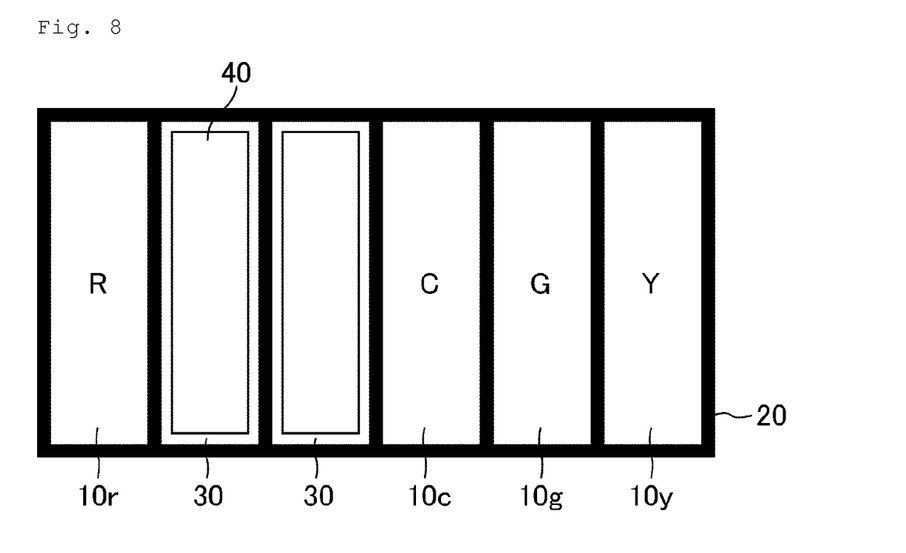
FIG. 8 is a plan view showing a pixel subjected to removal treatment of ink with a neutral color generated by color mixing in a manufacturing flow of the color filter substrate of Embodiment 1.
Figure 9:
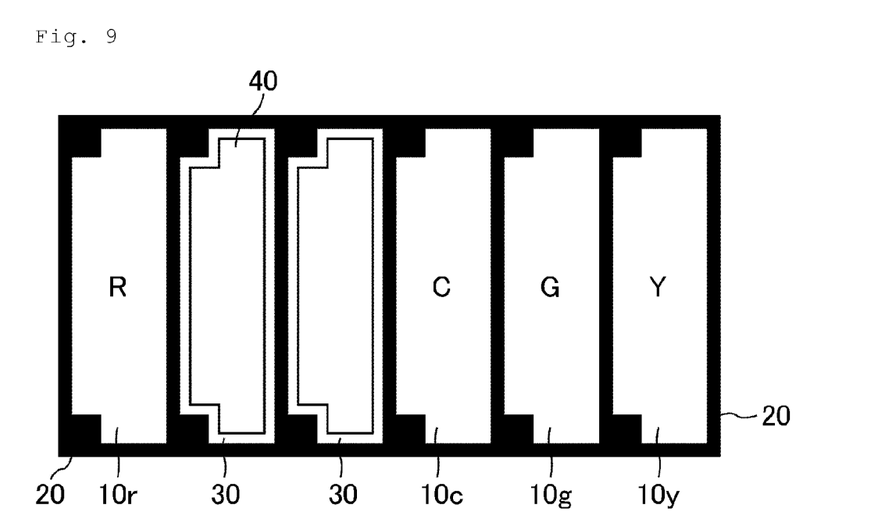
FIG. 9 is a plan view showing an example of a pixel in which the frame structure has a protrusion and in which an opening of the frame structure does not have a rectangle shape.

FIG. 8 is a plan view showing a pixel subjected to removal treatment of ink with a neutral color generated by color mixing in sub pixels. The sub pixels with color mixing are filled with ink 30 with a color different from a desired color. Such sub pixels cause display defect when used for a display device. Therefore, the sub pixels are examined for the presence or absence of color mixing after a usual formation step of the colored transparent layer. Sub pixels with color mixing are selectively subjected to removal treatment of the mixed color material 30. Examples of the removal treatment include irradiation with a laser beam such as a YAG laser beam. However, if the frame structure 20 around the sub pixel with color mixing is exposed to such a laser beam, the frame structure 20 is problematically shaved. Therefore, the color mixing portion in the sub pixel tends to be difficult to be completely removed by irradiation with a laser beam in view of its accuracy. For example, when used as a light-shielding member, the frame structure 20 is provided with a protruded portion for preventing TFT formed on a counter substrate from being exposed to light. Such a frame structure 20 may not have a rectangle shape as shown in FIG. 9, which results in further difficulty in removal of the color mixing portion. Accordingly, as shown in FIG. 8, the mixed color material 30 generated by color mixing is left at an outer edge of the opening after the removal treatment. The mixed color material 30 is a transparent layer with a neutral color when two or more differently colored inks in adjacent sub pixels are mixed to be a neutral color. The mixed color material 30 is a transparent layer with the same color as that of an adjacent sub pixel when an ink of one sub pixel flows into the other sub pixel or when two or more differently colored inks in sub pixels are not completely mixed. The mixed color material 30 is a black-colored transparent layer when two or more differently colored inks are mixed to be black.

Figure 10:
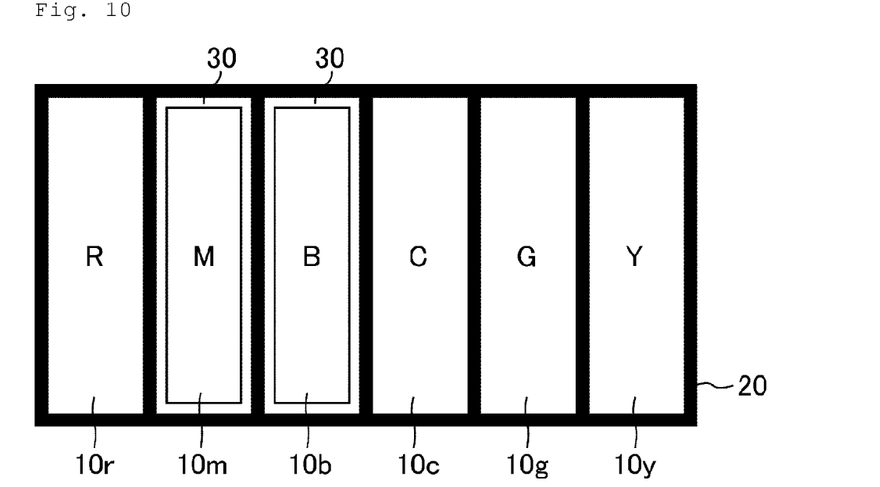
FIG. 10 is a plan view showing a pixel in which appropriate colored transparent layers are reproduced after the pixel is subjected to removal treatment in a manufacturing flow of the color filter substrate of Embodiment 1.

As shown in FIG. 10, transparent layers 10m and 10b with appropriate colors are recreated in the sub pixels subjected to the removal treatment as shown in FIG. 8, respectively. The mixed color material 30 with a color different from the colors of 10m and 10b is left around the colored transparent layers 10m and 10b. However, as mentioned above, in the present embodiment, the colored transparent layers 10r, 10m, 10b, 10c, 10g, and 10y are arranged such that a pair of differently colored transparent layers between which color difference and luminance difference are maximum are disposed away from each other. Since the color arrangement of the sub pixels are thus designed, the color difference and the luminance difference between the mixed color material 30 and the recreated colored transparent layers 10m and 10b are not large in the sub pixels in which transparent layers with original colors are recreated. Thereby, the influence on display qualities is suppressed. Accordingly, even if the frame structure 20 may be chipped at a plurality of portions of the sub pixels and color mixing is generated over a wider area, the influence on display qualities is sufficiently suppressed.

A common electrode and alignment films are formed on the color filter substrate when it is used for a liquid crystal display panel. Then, the color filter substrate is attached to a counter substrate, which is away produced, and a liquid crystal layer is disposed between the color filter substrate and the counter substrate. Thus, a liquid crystal display panel is produced. An optical film, such as a phase difference film, and a polarizing plate are attached on each of the both faces of the liquid crystal display panel if necessary.

The six differently colored transparent layers 10R, 10M, 10B, 10C, 10G, and 10Y may be arranged in a pixel in a row to form a stripe arrangement as shown in FIG. 1. Alternatively, the colored transparent layers may be arranged in a pixel in two rows and three columns or in three rows and two columns (an arrangement resembling the Chinese character for "field"; a square divided horizontally and vertically through the middle into four smaller squares). In such arrangements, the six differently colored transparent layers are preferably, for example, arranged as shown in FIG. 11.

Figure 11:
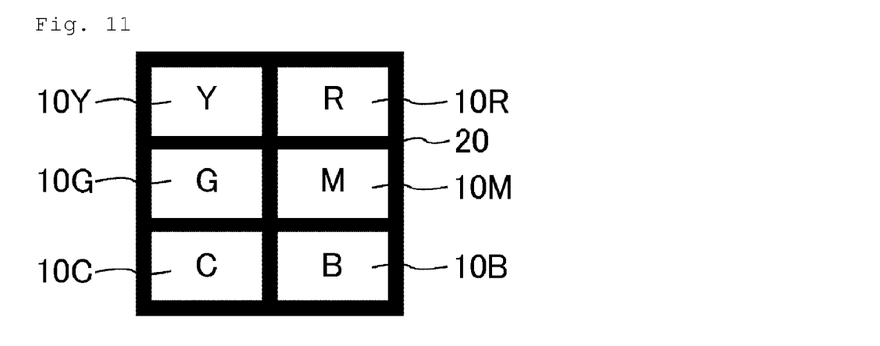
FIG. 11 is a plan view showing a color filter substrate of the present invention including a pixel in which colored transparent layers are arranged in three rows and two columns.

In the case where the colored transparent layers are arranged in a pixel in two or more rows as shown in FIG. 11, colored transparent layers in an even row and colored transparent layers in an odd row may be out of column by about half the width of a sub pixel in a direction parallel to the row (substantially delta arrangement).

Comparative Embodiment 1

Figure 14:
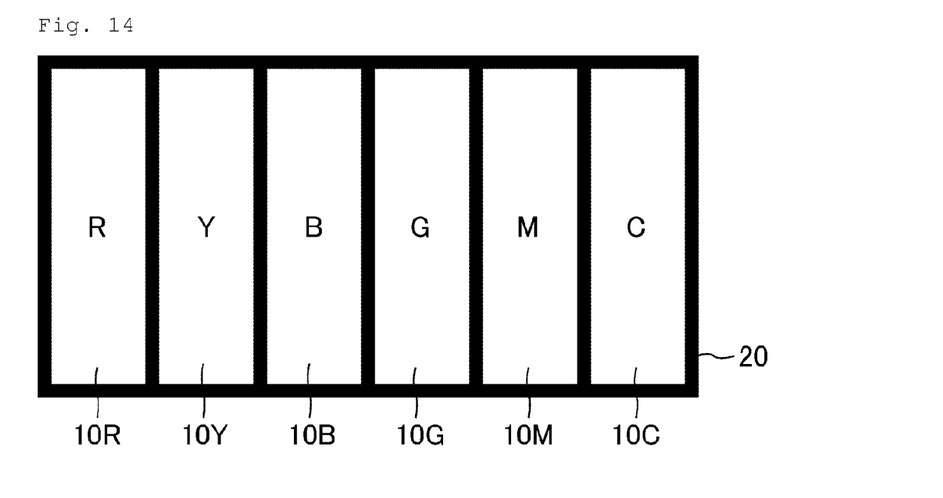
FIG. 14 is a plan view schematically showing the structure of the color filter substrate of Comparative Embodiment 1.
Figure 15:
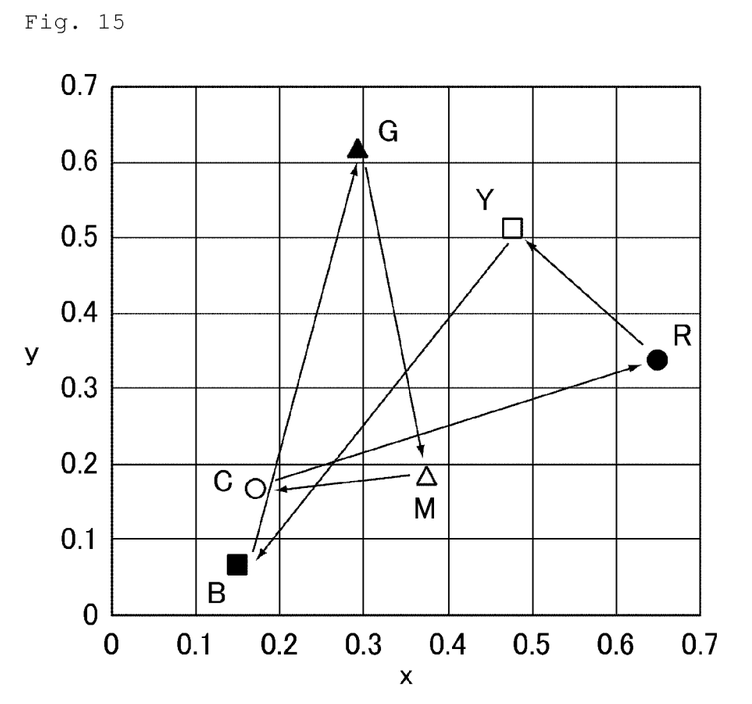
FIG. 15 is a view illustrating relations of pairs of adjacent colors of the color arrangement in the pixel of Comparative Embodiment 1.

The present comparative embodiment describes an example of arrangement of six differently colored transparent layers based on color difference. FIG. 14 is a plan view schematically showing the structure of the color filter substrate of Comparative Embodiment 1. The present comparative embodiment is the same as Embodiment 1 except that six differently colored transparent layers of a red (R) layer, a yellow (Y) layer, a blue (B) layer, a green (G) layer, a magenta (M) layer, and a cyan (C) layer are arranged in this order in each pixel. FIG. 15 is a view illustrating relations of adjacent colors of the color arrangement in the pixel of Comparative Embodiment 1. In the view, adjacent colors of sub pixels are connected to each other with straight lines on an XYZ color system chromaticity diagram. The straight lines cross one another. The view indicates that color difference between adjacent colors of sub pixels is large. In the color arrangement, a blue (B)-colored transparent layer which shows the maximum color difference with respect to a green (G)-colored transparent layer is adjacent to the green (G)-colored transparent layer, a yellow (Y)-colored transparent layer which shows the maximum color difference with respect to a blue (B)-colored transparent layer is adjacent to the blue (B)-colored transparent layer, a green (G)-colored transparent layer which shows the maximum color difference with respect to a magenta (M)-colored transparent layer is adjacent to the magenta (M)-colored transparent layer, a blue (B)-colored transparent layer which shows the maximum color difference with respect to a yellow (Y)-colored transparent layer is adjacent to the yellow (Y)-colored transparent layer.

Embodiment 2

Figure 12:
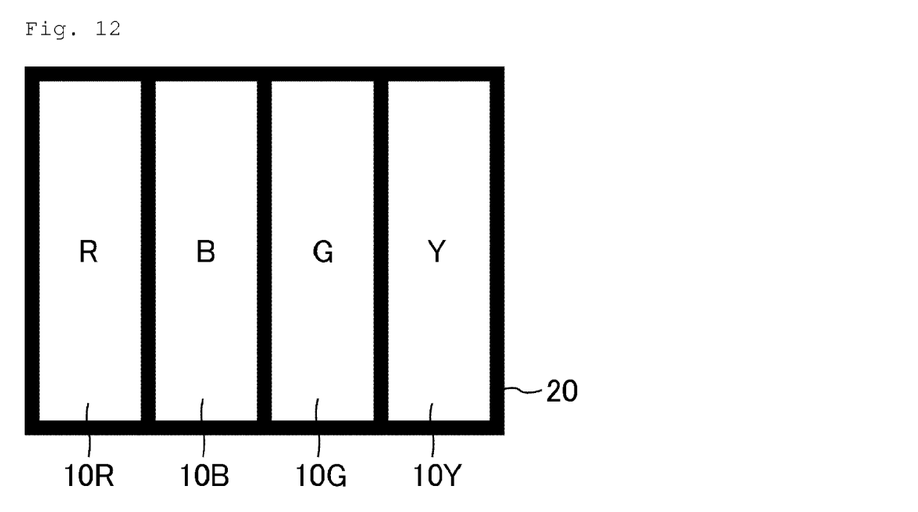
FIG. 12 is a plan view schematically showing the structure of the color filter substrate of Embodiment 2.

The present embodiment describes an example of arrangement of four differently colored transparent layers. FIG. 12 is a plan view schematically showing the structure of the color filter substrate of Embodiment 2. The present embodiment is the same as Embodiment 1 except that four differently colored transparent layers of a red (R) layer, a blue (B) layer, a green (G) layer, and a yellow (Y) layer are arranged in this order in each pixel. Also in the color arrangement, the transparent layers are arranged such that a pair of differently colored transparent layers between which color difference and/or luminance difference become maximum are disposed away from each other. In the present embodiment, red (R) is adjacent to blue (B), blue (B) is adjacent to green (G), and green (G) is adjacent to yellow (Y) in the color display unit. Yellow (Y) is adjacent to red (R) at the boundary between two adjacent pixels. In the color arrangement of the present embodiment (red (R)-blue (B)-green (G)-yellow (Y)-red (R)), an average of color difference values and an average of luminance difference values for pairs of adjacent colored transparent layers becomes minimum.

The four differently colored transparent layers may be arranged in a pixel in a row to form a stripe arrangement as shown in FIG. 12. Alternatively, the colored transparent layers may be arranged in a pixel in two rows and two columns (an arrangement resembling the Chinese character for "field"; a square divided horizontally and vertically through the middle into four smaller squares). In such an arrangement, the colored transparent layers are preferably, for example, arranged as shown in FIG. 13.

Figure 13:
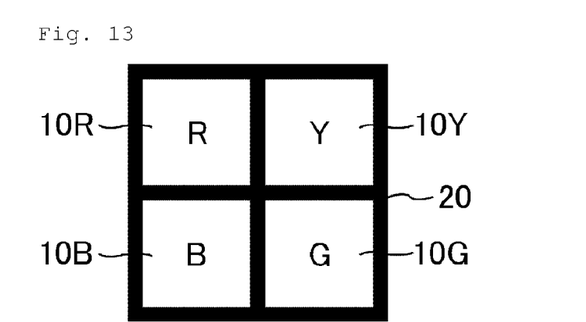
FIG. 13 is a plan view showing a color filter substrate of the present invention including a pixel in which colored transparent layers are arranged in two rows and two columns.

In the case where the colored transparent layers are arranged in a pixel in two or more rows as shown in FIG. 13, colored transparent layers in an even row and colored transparent layers in an odd row may be out of column by about half the width of a sub pixel in a direction parallel to the row (delta arrangement).

Comparative Embodiment 2

Figure 16:
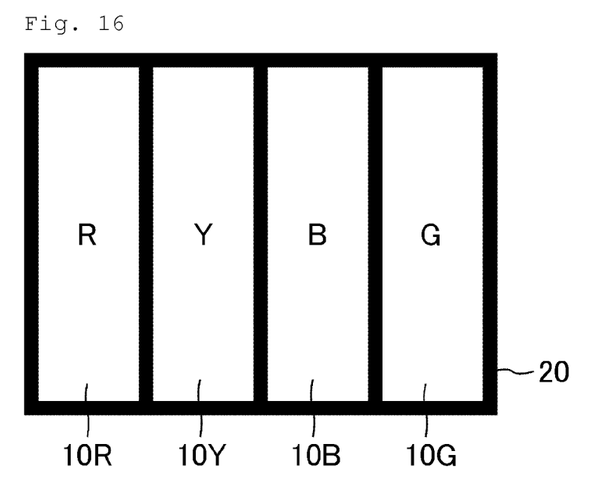
FIG. 16 is a plan view schematically showing the structure of the color filter substrate of Comparative Embodiment 2.
Figure 17:
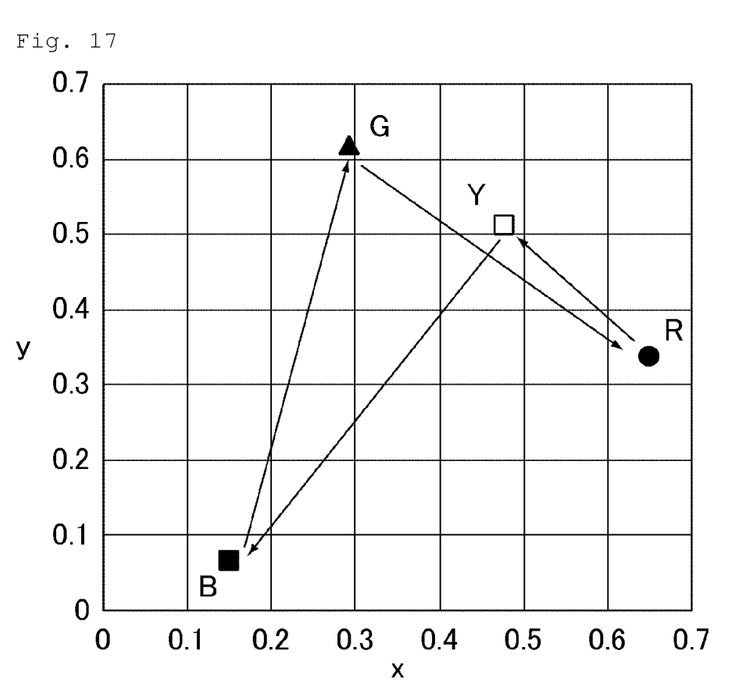
FIG. 17 is a view illustrating relations of pairs of adjacent colors of the color arrangement in the pixel of Comparative Embodiment 2.

The present comparative embodiment describes an example of arrangement of four differently colored transparent layers based on color difference. FIG. 16 is a plan view schematically showing the structure of the color filter substrate of Comparative Embodiment 2. The present embodiment is the same as Embodiment 2 except that four differently colored transparent layers of a red (R) layer, a yellow (Y) layer, a blue (B) layer, and a green (G) layer are arranged in this order in each pixel. FIG. 17 is a view illustrating relations of adjacent colors of the color arrangement in the pixel of Comparative Embodiment 2. In the view, adjacent colors of sub pixels are connected to each other with straight lines on an XYZ color system chromaticity diagram. The straight lines cross one another. The view indicates that color difference between adjacent colors of sub pixels is large. In the color arrangement, a blue (B)-colored transparent layer which shows the maximum color difference with respect to a green (G)-colored transparent layer is adjacent to the green (G)-colored transparent layer, a yellow (Y)-colored transparent layer which shows the maximum color difference with respect to a blue (B)-colored transparent layer is adjacent to the blue (B)-colored transparent layer, a blue (B)-colored transparent layer which shows the maximum color difference with respect to a yellow (Y)-colored transparent layer is adjacent to the yellow (Y)-colored transparent layer.

The structures of the above-described Embodiments may be suitably combined with each other without departing from the scope of the present invention.

The present application claims priority to Patent Application No. 2009-208452 filed in Japan on Sep. 9, 2009 under the Paris Convention and provisions of national law in a designated State. The entire contents of which are hereby incorporated by reference.

EXPLANATION OF NUMERALS AND SYMBOLS

10 Color display unit (Pixel)
10b Blue (B) ink
10B Blue (B)-colored transparent layer
10c Cyan (C) ink
10C Cyan (C)-colored transparent layer
10g Green (G) ink
10G Green (G)-colored transparent layer
10m Magenta (M) ink
10M Magenta (M)-colored transparent layer
10r Red (R) ink
10R Red (R)-colored transparent layer
10y Yellow (Y) ink
10Y Yellow (Y)-colored transparent layer
20 Frame structure (Black matrix)
30 Mixed color ink
40 Opening of frame structure (Mixed color material removed portion)

The invention claimed is:

1. A color filter substrate, comprising a plurality of color display units, each of the color display units including four or more differently colored transparent layers,
wherein the color filter substrate includes a frame structure which surrounds each of the differently colored transparent layers, and
the differently colored transparent layers are arranged such that an average of color difference values for pairs of adjacent differently colored transparent layers becomes minimum.

2. The color filter substrate according to claim 1,
wherein the four or more transparent layers are arranged such that a pair of differently colored transparent layers between which color difference is maximum are disposed away from each other.

3. The color filter substrate according to claim 1,
wherein the transparent layers are formed by an ink-jet method.

4. The color filter substrate according to claim 1,
wherein each of the transparent layers is arranged in a central portion of an area surrounded by the frame structure, and
a color mixing portion generated by adjacent differently colored transparent layers is left at an outer edge portion of the area surrounded by the frame structure.

5. The color filter substrate according to claim 1,
wherein the frame structure is made of a light-shielding resin material.

6. The color filter substrate according to claim 1,
wherein in at least a direction parallel to a shorter side of a colored transparent layer, the transparent layers are arranged such that a pair of differently colored transparent layers between which color difference is maximum are disposed away from each other.

7. The color filter substrate according to claim 1,
wherein in at least a direction perpendicular to the line of the narrower portion of the frame structure, the transparent layers are arranged such that a pair of differently colored transparent layers between which color difference is maximum are disposed away from each other.

8. A liquid crystal display panel, comprising:
the color filter substrate according to claim 1;
a counter substrate; and
a liquid crystal layer disposed between the color filter substrate and the counter substrate.

9. A liquid crystal display device, comprising the liquid crystal display panel according to claim 8.

10. A color filter substrate, comprising a plurality of color display units, each of the color display units including four or more differently colored transparent layers,
wherein the color filter substrate includes a frame structure which surrounds each of the differently colored transparent layers, and
the differently colored transparent layers are arranged such that an average of luminance difference values for pairs of adjacent differently colored transparent layers becomes minimum.

11. The color filter substrate according to claim 10,
wherein the four or more transparent layers are arranged such that a pair of differently colored transparent layers between which luminance difference is maximum are disposed away from each other.

12. The color filter substrate according to claim 10,
wherein the transparent layers are formed by an ink-jet method.

13. The color filter substrate according to claim 10,
wherein each of the transparent layers is arranged in a central portion of an area surrounded by the frame structure, and
a color mixing portion generated by adjacent differently colored transparent layers is left at an outer edge portion of the area surrounded by the frame structure.

14. The color filter substrate according to claim 10,
wherein the frame structure is made of a light-shielding resin material.

15. The color filter substrate according to claim 10,
wherein in at least a direction parallel to a shorter side of a colored transparent layer, the transparent layers are arranged such that a pair of differently colored transparent layers between which luminance difference is maximum are disposed away from each other.

16. The color filter substrate according to claim 10,
wherein in at least a direction perpendicular to the line of the narrower portion of the frame structure, the transparent layers are arranged such that a pair of differently colored transparent layers between which luminance difference is maximum are disposed away from each other.

17. A liquid crystal display panel, comprising:
the color filter substrate according to claim 10;
a counter substrate; and
a liquid crystal layer disposed between the color filter substrate and the counter substrate.

18. A liquid crystal display device, comprising the liquid crystal display panel according to claim 17.

* * * * *